United States Patent [19]
Athenes

[11] Patent Number: 5,878,279
[45] Date of Patent: Mar. 2, 1999

[54] HDLC INTEGRATED CIRCUIT USING INTERNAL ARBITRATION TO PRIORITIZE ACCESS TO A SHARED INTERNAL BUS AMONGST A PLURALITY OF DEVICES

[75] Inventor: Claude Athenes, Paris, France

[73] Assignee: SGS-Thomson Microelectronics S.A., Saint Genis, France

[21] Appl. No.: 690,928

[22] Filed: Aug. 1, 1996

[30] Foreign Application Priority Data

Aug. 3, 1995 [FR] France ................................. 95 09636

[51] Int. Cl.$^6$ ...................................................... G06F 13/26
[52] U.S. Cl. ............................................................ 395/860
[58] Field of Search ................................... 395/800, 293, 395/300, 842, 846, 872; 711/169; H01L 25/065

[56] References Cited

U.S. PATENT DOCUMENTS

| | | | |
|---|---|---|---|
| 5,175,818 | 12/1992 | Kunimoto et al. | 395/200 |
| 5,434,976 | 7/1995 | Tan et al. | 395/200 |
| 5,590,357 | 12/1996 | Intrater et al. | 395/800 |

OTHER PUBLICATIONS

French Search Report from French Patent Application No. 95 09636, filed Aug. 3, 1995.
IBM Technical Disclosure Bulletin, vol. 34, No. 10a, Mar. 1992, New York, US, pp. 259–263, "Transmit Data Control Block Structure Defined To Optimize Performance Of A High Level Data Link Controller Running In A Layered Microcode Environment".
Patent Abstracts of Japan, vol. 13, No. 125 (P–847), Mar. 28, 1989 & JP–A–63 293658 (Hitachi Ltd.).
IBM Technical Disclosure Bulletin, vol. 28, No. 6, Nov. 1985, New York, US, pp. 2633–2634, "Method Of Communication Of a High Speed Communication Adapter".

*Primary Examiner*—Thomas C. Lee
*Assistant Examiner*—Chien Yuan
*Attorney, Agent, or Firm*—Wolf, Greenfield & Sacks, P.C.

[57] ABSTRACT

This invention relates to an integrated HDLC circuit of the type including at least one HDLC controller and one DMA controller, and means for organizing the access to a first external bus for connection to an external memory, via an internal bus to which are connected different entities, which require to have access to the external memory, the internal bus being connected to the first external bus via a memory controller integrated in the HDLC circuit.

28 Claims, 5 Drawing Sheets

HDLC INTEGRATED CIRCUIT USING INTERNAL ARBITRATION TO PRIORITIZE ACCESS TO A SHARED INTERNAL BUS AMONGST A PLURALITY OF DEVICES

BACKGROUND OF THE INVENTION

1. Field of the Invention

The present invention relates to a system for controlling data links, or High Level Data Link Controller (HDLC) circuit. It more particularly relates to the organization of the data exchanges between different components of such an HDLC circuit and a shared RAM.

2. Discussion of the Related Art

An example of application of the present invention relates to the implementation of an integrated HDLC circuit including one or several high level data link controllers (HDLC). One HDLC (or several) is to be found, for example, in cards, called line cards, of switch centers of a telecommunication network. These line cards are notably meant for branching the different communications which circulate, for example in multiplex, onto data links. The data relative to these communications, as well as the information that they require (for example, the transmission mode, the addressee, etc.), only transit through these line cards. A line card includes a RAM for temporarily storing the data and information relative to the communications. The line card also includes a microprocessor for, notably, controlling the exchanges between the different card components and, in particular, the accesses to the memory. A circuit to which the present invention applies can also be found, for example, in the sender-receiver of a group switching center of a telephone network.

Besides the microprocessor, several components associated with the HDLC controller regularly require access to the memory, whether to write in it or to read information and data from it. They thus need to have access to address and data buses of this memory. These components are, in particular, direct memory access controllers, or DMA controllers.

SUMMARY OF THE INVENTION

The present invention aims at implementing an HDLC integrated circuit having an operation requiring a minimum of microprocessor intervention.

In particular, the present invention aims at implementing an HDLC circuit with the memory accesses of its different components being organized by the circuit itself, without using the microprocessor or other circuits.

The present invention also aims at organizing these accesses by using all the potential read or write cycles in case of an influx of requests.

The present invention also aims at implementing an HDLC integrated circuit which can adapt to different types of memory.

The present invention also aims at enabling the sharing of a same memory between several HDLC circuits of the same type associated with the same microprocessor and aims at organizing the memory accesses between the different circuits without using the microprocessor or other circuits.

To achieve these objects, the present invention provides an HDLC circuit of a type including at least one HDLC controller and one direct memory access controller, and including means for organizing access to a first external bus for connection to an external memory, via an internal bus to which are connected different entities, which need to have access to the external memory, the DMA controller being one of said entities and the internal bus being connected to the first external bus via a memory controller integrated to the HDLC circuit and constituting an electric interface between the internal bus and the external bus.

A memory controller, in the context of the present invention, is a device constituting an electric interface between the bus and the physical memory. In contrast with a direct memory access controller (DMA), this interface does not carry out any address calculation as a function of the data. It only transfers the addresses, the data and the control signals to the memory by achieving, if necessary, a multiplexing. The memory controller does not identify from which entity the data and the addresses come from, whereas the DMA controller generates addresses as a function of the data it receives.

According to an embodiment of the present invention, a microprocessor external to the circuit is also connected to the internal bus via a second external bus, the internal bus being connected to the second external bus via an interface integrated to the HDLC circuit, the accesses of the microprocessor to the internal bus being managed by the HDLC circuit which considers the microprocessor, on these grounds and via its interface, as one of its entities.

According to an embodiment of the present invention, the interface is programmable through pins of the HDLC circuit to adapt to different types of microprocessors.

According to an embodiment of the present invention, the memory controller includes programmable means to adapt to different memory types, capacities and access speeds, one entity of the HDLC circuit being constituted by a dynamic memory refreshing circuit.

According to an embodiment of the present invention, the organizing means of the accesses to the internal bus are constituted by an arbitration device receiving asynchronous binary signals representing requests for access to the internal bus issued by said entities, the arbitration device issuing binary signals authorizing the access to said entities based on a priority determination between the different access requests, by means of a wired logic priority decoder associated with an input register, a loading of the state of the access request signals in the input register happening, if no memory cycle is running, periodically, by means of a clock signal and, if a memory cycle is running, at the occurrence of a pulse on a signal issued by the memory controller and anticipating the end of the memory cycle by a delay which is a function of the processing time of the access requests by the priority decoder.

According to an embodiment of the present invention, the priority decoder sends to the memory controller a binary signal indicative of the presence of an authorized access request, the loading of the signals indicative of an access request in the input register being enabled by the inverse of the signal indicative of the presence of an authorized access request.

According to an embodiment of the present invention, the refreshing device has a particular priority management which consists in being assigned the smallest priority rank for a half-period of the time interval separating two of its access requests and the highest priority rank for the second half-period of this interval if its access request has not been answered during the first half-period.

According to an embodiment of the present invention, the priority rank associated with each entity, other than the refreshing device, is contained in a programmable register included by the arbitration device.

According to an embodiment of the present invention, three entities are respectively constituted by a DMA reception controller, a DMA transmission controller and an interrupt controller.

According to an embodiment of the present invention, the interrupt controller includes means for organizing the memorization of words representative of at least the origin and the nature of the interrupts emitted by different components of the HDLC circuit in several areas of the memory.

According to an embodiment of the present invention, the arbitration device of an HDLC circuit includes means for being connected to other arbitration devices of HDLC circuits of the same type to organize a sharing of the memory between several HDLC circuits, the assignment of the first external bus to one of the HDLC circuits being performed by circulating a pulse, or "token", in a single-wired line connecting the different circuits in a ring, each HDLC circuit receiving the "token" on an input signal sent by a preceding HDLC circuit onto an output signal.

According to an embodiment of the present invention, said means are further used to enable the assignment of the internal bus to one of the entities of the HDLC circuit when the "token" is present in the arbitration device included therein.

According to an embodiment of the present invention, the sending of the "token" by the arbitration device to the output signal is triggered either by the occurrence of the signal indicative of the end of a memory cycle, or by the absence of access requests from the entities of the HDLC circuit associated therewith while the "token" is present on the input signal.

According to an embodiment of the present invention, said means include a block for regenerating the "token", the regenerating block receiving, besides the input signal, a binary signal indicative of the existence of an access request within the HDLC circuit associated therewith and issuing, to the priority decoder of the arbitration device associated therewith, a binary signal indicative of an assignment of the "token", the width of the pulse which constitutes the "token" corresponding to one clock signal period.

These objects, features and advantages, as well as others, of the present invention will be discussed in detail in the following description of specific embodiments, taken in conjunction with the following drawings, but not limited by them.

DETAILED DESCRIPTION

For clarity, the same components have, as far as it is possible, been designated by the same reference numbers in the different figures. Similarly, only the components and the connections between these components which are necessary to the understanding of the invention have been shown.

A characteristic of the present invention is the provision, within the HDLC circuit, of an internal bus having its accesses managed by an arbitration device, the internal bus being connected to a first external bus for connection with a RAM and to a second external bus for connection with a microprocessor $\mu P$.

Unless otherwise indicated, the word "bus" according to the present invention designates a plurality of data, address and control buses, respectively, linking the different components.

According to the present invention, the occupancy of the first external bus (memory bus) is organized independently from the microprocessor. In other words, the invention provides the management of access requests performed by entities of the HDLC circuit which need to exchange data with the memory, without using the microprocessor. The microprocessor is, from this point of view and according to the present invention, considered as an entity. The occupation of the microprocessor is thus reduced, which makes it more available for performing other processings by using, should the case arise and independently from the memory bus, the second external bus which is its own bus (microprocessor bus).

Figure 1:
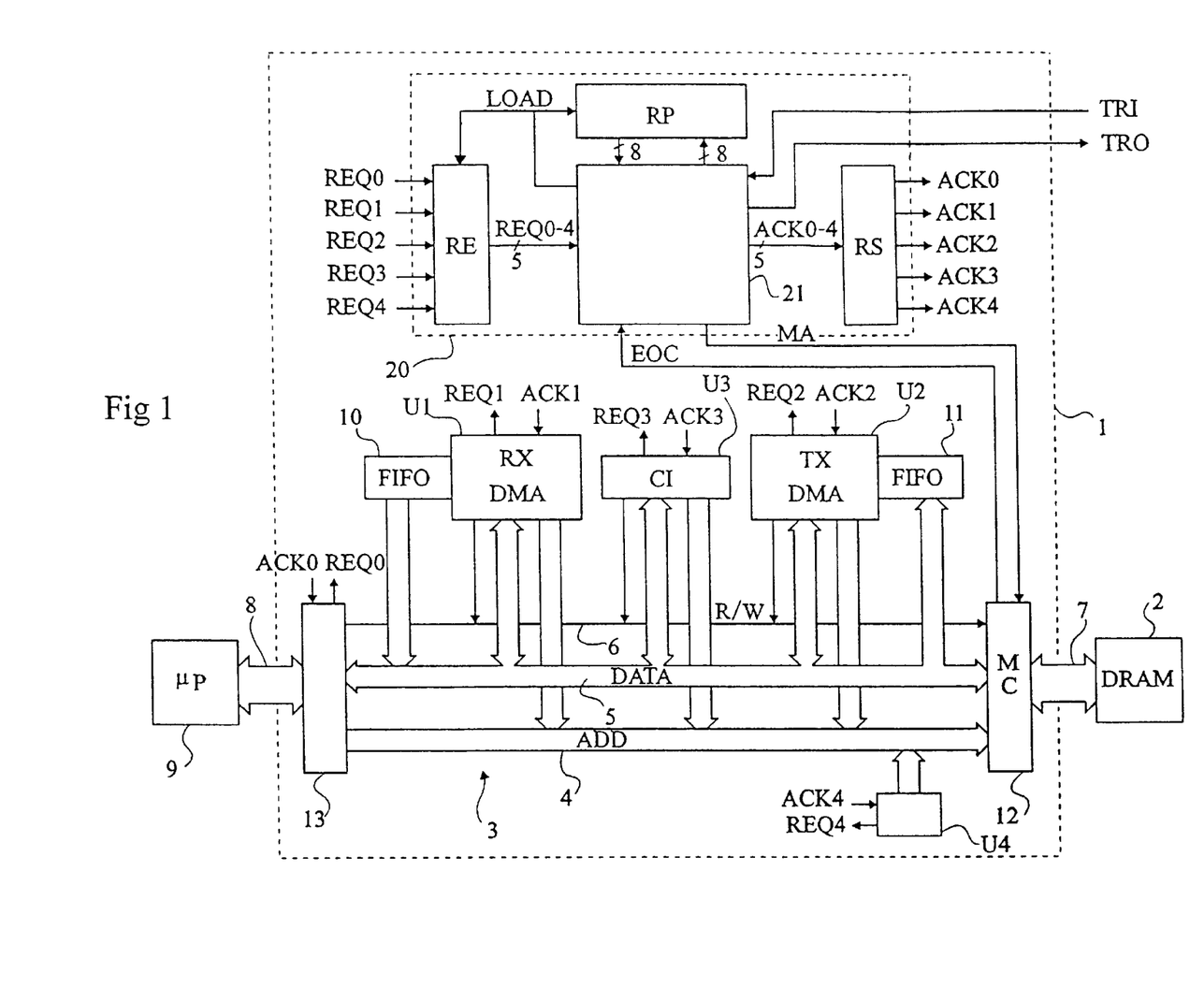
FIG. 1 shows, in the form of block diagrams, a first embodiment of an HDLC circuit according to the invention.

FIG. 1 shows an embodiment of an HDLC circuit 1 according to the invention. Circuit 1 is only partially shown. That is, only the components, or entities, of circuit 1 which need to exchange data with a memory 2 have been shown. In FIG. 1, an internal bus generally referred to by reference number 3 has been shown in detail. That is, an address bus ADD 4, a data bus DATA 5 and a single-wired bus 6 supporting a signal R/W indicating whether the entity having access to address bus 4 and to data bus 5 intends to read or write in memory 2. Conversely, the external buses 7 and 8 for connection, respectively, to memory 2 and to a microprocessor 9, have been shown generally although they actually have the same structure as internal bus 3.

Circuit 1 includes, notably, two direct memory access (DMA) controllers, respectively U1 and U2, and an interrupt management entity U3, or interrupt controller CI.

A first controller RX_DMA U1, for data reception, has the function of storing in memory 2 all the information relative to the incoming communications. It also has the function of storing in memory 2, via a FIFO memory 10 associated therewith, the data relative to these communications.

A second controller TX_DMA U2, for data transmission, has the function of extracting from memory 2 all the information relative to the communications to be transmitted. It also has the function of extracting from memory 2, via a FIFO memory 11 associated therewith, the data relative to these communications.

Interrupt controller U3, according to another characteristic of the invention which will be discussed hereafter, has the function of storing in memory 2 any remarkable event linked with the operation of HDLC circuit 1.

Circuit 1 also includes a device U4 for refreshing a DRAM. The associating of such a refreshing device U4 with circuit 1 enables, as will be seen hereafter, to make the circuit independent from the type (static or dynamic) of memory used.

Internal bus 3 is, according to the invention, connected to interface devices, respectively 12 and 13, for enabling exchanges with the external buses, respectively 7 and 8. That is, a memory controller MC 12 and an interface 13 of the microprocessor are, according to the invention, integrated in circuit 1.

The role of these interfaces 12 and 13 is to adapt the addresses, the data and the control signals, respectively, to the memory and the microprocessor associated to the HDLC circuit.

The four entities U1, U2, U3 and U4 of circuit 1 which require access to memory 2 are also connected to internal bus 3.

The entities U1, U2 and U3 (RX_DMA, TX_DMA and CI) are connected to address bus 4, data bus 5 and control bus R/W 6 since they are likely to read and write in cells of memory 2.

FIFO memory 10 is only connected to data bus 5 since it has the function of storing, in memory 2 and under control of controller RX_DMA U1 which thus supplies the address of memory 2, the data relative to the communications received.

FIF memory 11 is only connected to data bus 5 since it has the function of extracting, from memory 2 and under control of controller TX_DMA U2 which thus supplies the address of memory 2, the data relative to the communications to be transmitted.

Memory refreshing device U4 is only connected to address bus 4 since the refreshing of a dynamic memory only consists in periodically addressing the cells of memory 2.

An advantage of the present invention is that by using internal bus 3 and the first external bus 7, microprocessor 9 no longer has to organize the accesses to memory 2 between the entities U1, U2, U3 and U4 of circuit 1.

Another advantage of the invention is that by integrating the interface 13 of microprocessor 9 and memory controller 12 to circuit 1, circuit 1 can be associated with different types of memories 2 and of different types of microprocessors 9.

The interface 13 of the microprocessor is, according to the invention, programmable by pins of the circuit to choose the type of microprocessor 9, for example between an 8-bit, 16-bit or 32-bit microprocessor with multiplexed or non-multiplexed addresses and data.

Memory controller 12 is, according to the invention, programmable by means of registers enabling a user to select, notably the type (SRAM or DRAM), the size and the cycle time of memory 2.

According to the invention, the accesses to memory 2 are exclusively managed by HDLC circuit 1. For this purpose, circuit 1 includes a device 20 for organizing, or arbitrating, the accesses to internal bus 3 between microprocessor 9 and the entities U1, U2, U3 and U4 of circuit 1.

For clarity, only the connections linked with the operation of device 20 for organizing these accesses to internal bus 3 have been shown in FIG. 1.

All the entities, as well as microprocessor 9, are likely to issue asynchronous access requests which are sent onto inputs of an input register RE of device 20. These access requests are sent by the interface 13 of microprocessor 9 and by the entities, respectively U1, U2, U3 and U4, in the form of binary signals, respectively REQ0, REQ1, REQ2, REQ3 and REQ4, the state of which indicates a requirement, or the absence of requirement, to access to internal bus 3. For example, the idle state of signals REQ0 to REQ4 is a "0" state and these signals are positioned in a "1" state when the entity associated therewith requests access to memory 2.

A priority decoder 21 periodically loads signals REQ0 to REQ4 into register RE and interprets them immediately. The loading period of register RE corresponds, in case of an influx of requests and as will be seen hereafter, to the duration of a read or write cycle in memory 2. The function of register RE is to avoid conflicts within priority decoder 21 since the states of signals REQ0 to REQ4 change asynchronously.

The interpreting of signals REQ0 to REQ4 by decoder 21 has the purpose of determining which entity, among those which have requested access to bus 3, has the highest priority rank and is to be granted the access. Priority decoder 21 decides to grant microprocessor 9 or a given entity access to internal bus 3 according to the priority rank associated with the entity (or with microprocessor 9) and contained in a register RP programmable by microprocessor 9. This register RP is, for example, an eight-bit register which contains a coding of the priority ranks associated with the three entities U1, U2, U3 (RX_DMA, TX_DMA and CI) and with microprocessor 9. According to the invention, the entity or refreshing device U4 is assigned a specific priority under a priority management scheme which will be described in relation with the description of the contents of programmable register RP and which will be provided hereafter.

RAM 2 thus can be, according to the invention, an SRAM or a DRAM. If memory 2 is an SRAM, arbitration device 20 organizes the access to internal bus 3 between microprocessor 9 and entities U1, U2 and U3.

The decision of priority decoder 21 is transmitted to the interface 13 of microprocessor 9 and to the different entities U1, U2, U3 and U4 in the form of binary signals, respectively ACK0, ACK1, ACK2, ACK3 and ACK4, the state of which indicates for each entity whether the authorization to access to internal bus 3 has been granted or not. For example, a "0" state present on one of signals ACK0 to ACK4 indicates that bus 3 is not available (or not requested) for the corresponding entity, while a "1" state indicates that its entity has been granted access.

Signals ACK0 to ACK4 transit through an output register RS so that the accesses to internal bus 3 are synchronous with a control clock (not shown). This clock corresponds, for example, to the clock of microprocessor 9 and is, for example, a 32 MHz clock. It should however be noted that signals REQ1 to REQ4 are not necessarily synchronous with this clock. The control signals connected to the clock have not been shown in FIG. 1 for clarity.

In the example shown, registers RE and RS are five-bit registers. The arbitration device according to the invention can of course be sized to organize by means of a same arbitration device 20 the accesses of a greater number of entities to internal bus 3. For this purpose, the number of bits of registers RE, RS and RP will have to be increased.

Other entities outside circuit 1 can, should the case arise, have access to internal bus 3 via microprocessor 9. These entities can be, for example, peripherals of microprocessor 9. In such a case, these peripherals use the second external bus 8 to have access to internal bus 3. However, external bus 8 is managed by microprocessor 9, which requests from device 20 of circuit 1 the accesses to memory 2, whether for itself or for the other entities connected to bus 8.

It should be noted that microprocessor 9 is, from the viewpoint of circuit 1, considered as an entity.

The states of signals REQ0 to REQ4 change randomly and several access requests from different entities can, or not, be simultaneous. Conversely, on the output side of device 20, a single one of authorization signals ACK0 to ACK4 has a "1" state corresponding to an access authorization, all the other authorization signals being at "0".

Two signals, respectively EOC and MA provide, according to the invention, a synchronization between internal bus 3 of HDLC circuit 1 and external bus 7 for connection to memory 2.

Signal EOC is a signal which indicates, by a pulse issued by memory controller 12, the end of a read or write cycle. This EOC signal is sent, by memory controller 12, to priority decoder 21.

Signal MA is issued, by decoder 21, to memory controller 12 to indicate the presence of an access request to be granted thereto. Signal MA is a binary signal, the state of which indicates to controller 12 that memory 2 will, or will not, be addressed. For example, a "1" state indicates that an access authorization has been granted by arbitration device 20. The positioning of signal MA to state "1" is simultaneous with the positioning to state "1" of one of signals ACK0 to ACK4. Signal MA is, for example, obtained by the addition (logic OR) of signals ACK0 to ACK4, or of signals REQ0 to REQ4 at the output of register RE. Signal MA is positioned in state "0" at the arrival of a pulse on signal EOC to indicate that memory 2 is free for a new access.

Although it has not been shown, register RS includes an additional bit for signal MA to be synchronous with that of signals ACK0 to ACK4 which is positioned in state "1".

If signal MA is in state "0" and an entity U1, U2, U3 or U4 or microprocessor 9 sends an access request, the request is, according to the invention, satisfied almost immediately. For this purpose, the loading of the state of signals REQ0 to REQ4 into register RE, and thus the potential authorization of a new access by priority decoder 21, is controlled by a signal LOAD from priority decoder 21.

This signal LOAD is configured to enable a periodical loading, the fastest possible, if memory 2 is free when an access request arrives onto one of the inputs of register RE.

Conversely, if an access request arrives during a read or write cycle of memory 2, the loading of the state of signals REQ0 to EQ4 into register RE is authorized by signal LOAD at the arrival of a pulse carried by signal EOC. Signal LOAD is, for example, the result of a logic combination of the "OR" type (not shown) of the product of signal EOC by signal MA and of the product of a clock signal CLK by the inverse of signal MA.

The arrival of a pulse on signal EOC further serves for decoder 21 to switch that of signals ACK0 to ACK4 which is in state "1" to state "0". This enables to both authorize the access to internal bus 3 to another entity and to inform the entity which has just had access to bus 3 that memory 2 has ended its task. When a signal ACK switches to state "1", the entity associated therewith presents an address on the address bus and the read/write bit on single-wired bus 6. If the entity has addressed the memory in the write mode, it also presents the data on data bus 5. If the entity has addressed the memory in the read mode, it samples data bus 5 when signal ACK switches to state "0".

Signal LOAD also controls the reading of programmable register RP by decoder 21.

Decoder 21 issues to memory controller 12 the binary signal MA which indicates thereto, by its state, whether memory 2 will be addressed or not. State "0" indicates that no request is present at the inputs of register RE while state "1" indicates that an access authorization has been granted.

Priority decoder 21 further receives a signal TRI and issues a signal TRO. These two signals have to do with a possibility, according to the invention, of sharing a same external bus 7 between several HDLC circuits 1, each priority decoder 21 including an arbitration device 20 as will be seen in relation with FIG. 3.

An advantage of the present invention is that the assignment of bus 3 to an entity U1, U2, U3, U4 or to microprocessor 9 occurs without the intervention of microprocessor 9.

Another advantage of the present invention is that the priority ranks assigned to microprocessor 9 and to entities U1, U2 and U3 can be dynamically modified by a mere changing of the codes contained within programmable register RP. The programming of this register is conventionally performed by means of microprocessor 9.

This register RP is, for example, an eight-bit register which contains a coding of the priority assigned to the three entities U1, U2, U3 (RX_DMA, TX_DMA, CI) and to microprocessor 9. As it has already been stated, the priority of device U4 for refreshing a DRAM is managed in a different way.

Each of the remaining three entities (and microprocessor 9) is identified by a two-bit code. The eight bits of register RP are divided into four pairs of bits, respectively {P10, P11}, {P20, P21}, {P30, P31} and {P40, P41}. The priority rank of an entity is determined by the pair of bits wherein the code which identifies it is introduced. The bits contained in the pair {P10, P11} correspond to the identifying bits of the entity having the highest priority rank among the entities (U1, U2, U3 and 9) which are coded. The code identifying the entity with the lowest priority rank is contained in the pair {P40, P41}.

A feature of the present invention is that priority decoder 21 actually works on six priority ranks, and not on four. Indeed, two additional priority ranks are assigned to refreshing device U4 if memory 2 is a DRAM. By naming P1, P2, P3 and P4 the priority ranks programmably assigned to entities U1, U2, U3 and to microprocessor 9, the two additional ranks assigned to refreshing device U4 are P0 and P5. Rank P0 is the absolute priority rank while rank P5 is the lowest priority rank.

Thus, according to the invention, two priority ranks are assigned to refreshing device U4. For this purpose, the fact that the refreshing of a dynamic memory is not performed randomly, but periodically, and the fact that this refreshing is not performed once for the whole memory but by portions thereof, is used.

Conventionally, the time period between two memory accesses of a refreshing device is fixed and the refreshing device is assigned the highest priority rank. Indeed, it cannot be allowed, if the contents of the memory are intended not to be lost, for the memory not to be refreshed for too long a time duration under the pretext that other entities, which would have held the priority with respect to the refreshing, are requesting access to memory 2 at the same time as the device. Conventionally, the refreshing device is assigned memory 2 as soon as it requests it, for example every 15 microseconds, for at least the duration of a read cycle. In fact, the complete refreshing of memory 2 is much longer (of about 1 to 8 milliseconds according to the capacity of memory 2) but does not happen in a single run.

According to the invention, refreshing device U4 is assigned either the lowest priority rank P5 or the highest priority rank P0 and this, according to whether it has been granted the access it has requested while in a time period where it had the lowest priority rank P5.

In other words, for a first half-period (for example 7.5 milliseconds) of the regular interval (for example, 15 milliseconds) between two requests for refreshing, the priority rank of entity U4 is P5, that is, it will have access to internal bus 3 only if the bus is free. If its request is answered during this half-period, its priority rank is not modified until the first half-period of the following interval. If, conversely, its request has not been answered during the first half-period, it is then assigned the absolute priority rank P0 for the second half-period of the regular interval between two of its access requests.

Thus, refreshing device U4 has access to internal bus 3, and thus to memory 2, in a regular, but not periodic, fashion. It has access to bus 3 once every 15-microsecond interval, but anywhere between the beginning of the interval and the first arrival of a pulse on signal EOC in the second half-period of the interval.

An advantage of the present invention is that, as there is a very strong chance that the request at rank P5 of entity U4 be answered during the first half-period, the other entities are not penalized in case of a temporary influx of simultaneous requests. The security of the refreshing device is however ensured by giving it the priority if the influx of requests continues after this first period.

The choice of the half-period as the priority rank changing limit of refreshing device U4 makes the processing of the priority particularly simple. Indeed, using the periodic access request signal REQ4 issued by entity U4 and dividing its period by two is enough to obtain a binary signal reflecting its priority.

According to the invention, the highest programmable priority rank P1 is assigned to controller RX_DMA U1 so that the information and data relative to the communications which arrive on the data links (not shown) are stored as fast as possible. Priority rank P2 is assigned to controller TX_DMA U2. Priority rank P3 is assigned to interrupt controller CI U3 and priority rank P4 is assigned to microprocessor 9.

Preferably, the logic of priority decoder 21 is implemented so that, in case of simultaneous requests, a same entity cannot be assigned internal bus 3, and thus memory 2, for two successive read or write cycles. In other words, an entity which has just had access to bus 3 must wait, at least for one memory cycle, if another request from another entity is waiting and this even if it has the highest relative priority rank (that is, among the entities requesting access). It is thus avoided that a same entity with the highest relative priority monopolizes bus 3.

An advantage of the present invention is that in case of an influx of access requests, there is no waiting between the end of a read or write cycle of memory 2 and the beginning of the following cycle. The read or write cycles of memory 2 thus can, according to the invention, be contiguous. Therefore, the organizing of the accesses to internal bus 3 causes no loss of time. If one or several entities request access to bus 3, they will be granted this access with no loss of time between two memory cycles.

Figure 2:
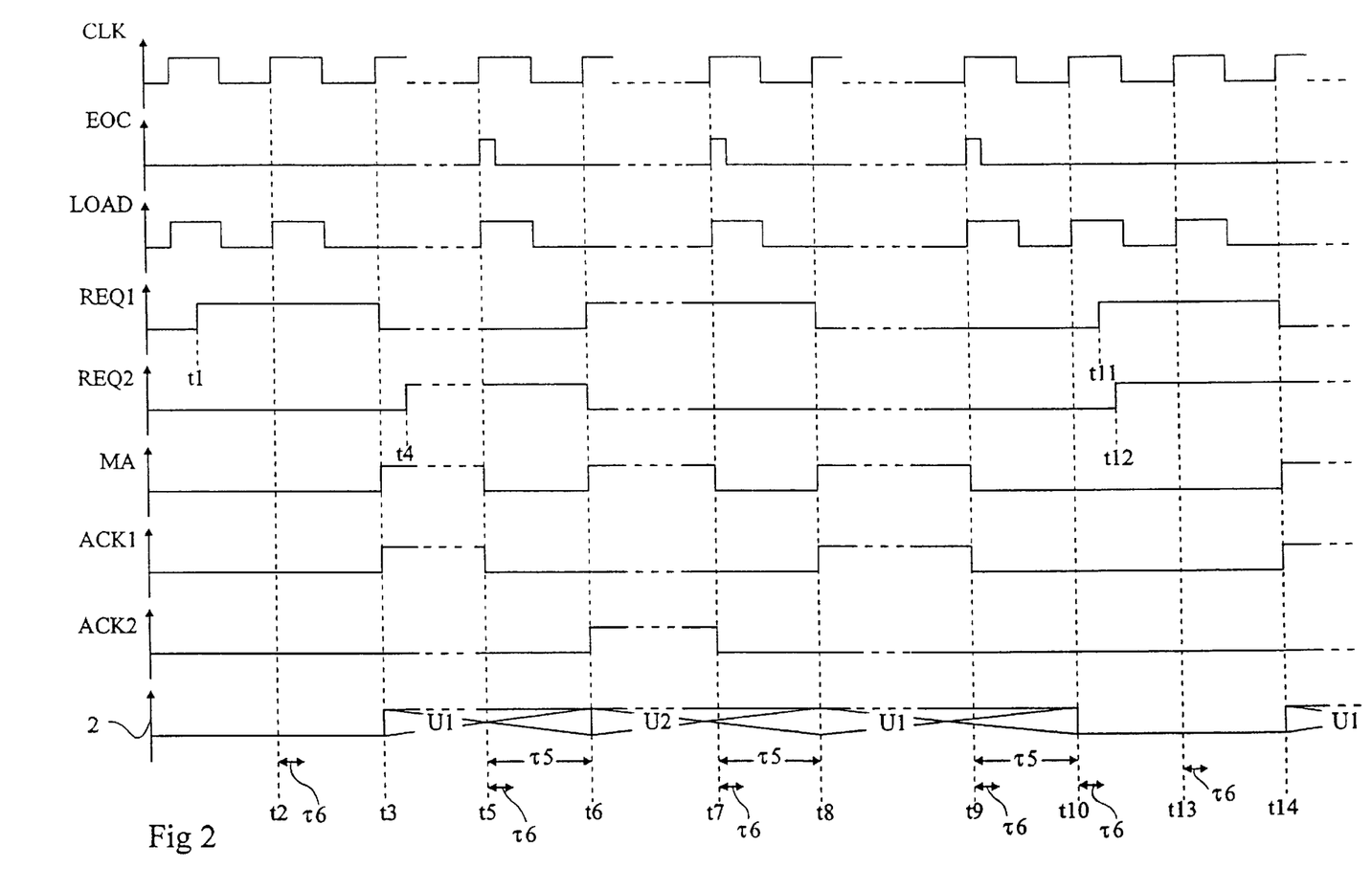
FIG. 2 illustrates, in the form of timing diagrams, the operation of an HDLC circuit as shown in FIG. 1.

This feature of the present invention will be better understood in relation to the following description of FIG. 2.

FIG. 2 shows, in the form of timing diagrams, an example of a situation of arbitration of the access to internal bus 3 by device 20. For clarity, it has been assumed for establishing the diagrams that only the DMA controllers, RX_DMA U1, and TX_DMA U2 were likely to require access to memory 2.

FIG. 2 shows the timing diagrams of signals CLK, EOC, LOAD, REQ1, REQ2, MA, ACK1 and ACK2 and of the cycles of memory 2. For clarity, these timing diagrams are not to scale.

It is assumed that no request is present before a time $t_1$ when controller RX_DMA U1 positions signal REQI in state "1". Before time $t_1$, signal LOAD thus causes the periodical loading of the states of signals REQ1 and REQ2 by following the cycles of clock signal CLK (signal MA is in state "0").

At time $t_1$, entity U1 requests access to internal bus 3. The loading of this request happens at the following rising edge (time $t_2$) of signal CLK.

It is assumed that priority decoder 21 requires a delay $\tau_6$ to examine the access requests and issue an access authorization. This delay depends on the logic of priority decoder 21. It is assumed that the delay is shorter than the period of signal CLK. This condition is easily implementable in practice. For example, the frequency of clock signal CLK is around 32 MHz and the delay $\tau_6$ required for decoding the priority is around 10 nanoseconds.

Thus, at a time $t_3$ which corresponds to the following rising edge of signal CLK, decoder 21 positions signals ACK1 and MA in state "1". The switching of signal ACK1 to state "1" causes signal REQ1 to switch to state "0", controller RX_DMA considering itself as served. The switching of signal MA to state "1" informs memory controller 12 of the beginning of a first read or write cycle in memory 2. In practice, the beginning of the memory cycle is slightly delayed with respect to the switching of signal MA to state "1".

At a time $t_5$, memory controller 12 issues a pulse on signal EOC. This pulse is, according to the invention, issued before the end of the memory cycle which happens at a time $t_6$, after a delay 5 with respect to this pulse. As memory controller 12 knows the duration of a memory cycle, it can be configured to issue the pulse on signal EOC in advance with respect to the end of a memory cycle and always with the same delay $\tau_5$. This enables priority decoder 21 to anticipate the end of a memory cycle. Delay $\tau_5$ is a function of the processing time of the access requests by device 20 (time $\tau_6$ and time required for the synchronizing by register RS).

According to the invention, memory controller 12 of circuit 1 is, for this purpose, associated with a programmable register (not shown), the contents of which enables controller 12 to identify the type, capacity and speed of the memory 2 that it has to control.

At time $t_5$ and under the effect of the pulse on signal EOC, signals MA and ACK1 switch back to state "0". Signal LOAD switches to state "1" during the pulse of signal EOC, which enables the loading of the states of signals REQ1 and REQ2 at time $t_5$. For clarity, the delay of the switching to state "0" of signals MA and ACK1 with respect to the arrival of the pulse on signal EOC has not been taken into account. In practice, the pulse on signal EOC arrives during the one period before the last of the signal CLK contained in the memory cycle so that signal MA switches to state "0" at the rising edge (here, time $t_5$) of the signal CLK which precedes the end of the memory cycle. (Thus, decoder 21 examines signals REQ1 and REQ2 during the last clock cycle of the ongoing memory cycle.)

In an example of operation, it is assumed that controller TX_DMA U2 has issued an access request at a time $t_4$ during the first memory cycle. This request is loaded in register RE at time $t_5$. Even if it is assumed that controller RX_DMA intends to perform two successive read or write cycles in memory 2, its signal REQ1 remains however in state "0" until time $t_6$, which corresponds to the actual end of the ongoing memory cycle. Indeed, controller RX_DMA does not position its signal REQ1 before the end of the memory cycle, since it still has access to internal bus 3.

Now, at this time $t_6$, decoder 21 positions signals MA and ACK2 in state "1" to grant controller TX_DMA access to bus 3. Thus, even if controller RX_DMA holds the priority in front of controller TX_DMA, its new successive access request will only be able to be answered at the end of the second memory cycle which is used by controller TX_DMA. It is thus avoided that controller RX_DMA monopolizes internal bus 3.

Another advantage of such an anticipated priority decoding with respect to the actual end of a memory cycle is that it enables the system to make the memory cycles contiguous in case of an influx of access requests. That is, time $t_6$ corresponds both to the end of the first memory cycle and to the beginning of the second memory cycle.

At a time $t_7$ where a pulse indicative of being close to the end of the second memory cycle appears on signal EOC, the state "1" of signal REQ1 and the state "0" of signal REQ2 are loaded in register RE. Thus, a new access to bus 3 is granted to controller RX_DMA, at a time $t_8$.

It is assumed that at the end (time $t_{10}$) of the third memory cycle, more precisely between a time $t_9$ where a pulse appears on signal EOC and the actual end (time $t_{10}$) of the memory cycle, no access request is present and controller RX_DMA does not immediately want a new access. An operation with periodic examination of the access requests under control of signal CLK is thus resumed.

As another example of operation, controllers RX_DMA and TX_DMA are assumed to both request an access to bus 3, respectively at times $t_{11}$ and $t_{12}$, included in a same period of signal CLK. For times $t_{11}$ and $t_{12}$ to be simultaneous or not is of no importance.

At the arrival of the following rising edge (time $t_{13}$) of signal CLK, the LOAD signal switches to state "1" and decoder 21 examines the access requests which are loaded into register RE. As two access requests are present, the decoder assigns bus 3 to the entity holding the priority, here controller RX_DMA, at a time $t_{14}$ which corresponds to the following rising edge of signal CLK.

Since controller TX_DMA has not been served, signal REQ2 remains in state "1" until the end of the fourth memory cycle assigned to controller RX_DMA.

Internal bus 3 will be assigned to controller TX_DMA at the end of this fourth memory cycle. As for the assignment of the second memory cycle, whether controller RX_DMA requests a new access does not matter, since this new possible request happens only after the assignment of bus 3 to controller TX_DMA.

An advantage of the present invention is the fact that HDLC circuit 1 adapts to any RAM 2, static or dynamic, and this occurs whatever its size and cycle length. Indeed, arbitration device 20 does not have to be dedicated to a specific memory, due to the use of signals EOC and MA and to the possible management of the refreshing of a DRAM.

According to the invention, still for freeing microprocessor 9, HDLC circuit 1 includes its own interrupt controller CI U3. This interrupt controller is meant to enable microprocessor 9 to process the interrupts generated by components of HDLC circuit 1 with a delay. Thus, microprocessor 9 can perform other tasks linked with peripherals connected on external bus 8 or with other HDLC circuits and only process the interrupts of circuit 1 when available.

For this purpose, interrupt controller U3 has the function of organizing a memorization, within memory 2, of the events appearing on the different components of HDLC circuit 1. Besides controllers RX_DMA and TX_DMA, other components of circuit 1, which have not been shown since they do not need to have direct access to memory 2, are, however, connected to interrupt controller U3.

By the memorization of the interrupts, microprocessor 9 is enabled to extract these events from memory 2 when available to process one or several interrupts.

Interrupt controller U3 processes the priorities associated with the different interrupts generated by the different components of HDLC circuit 1 by defining memory areas wherein microprocessor 9 will read and by itself determine the order in which to read them, that is, by giving itself an order of priority for the memory areas involved. The interrupt controller determines the address of memory 2 where at least one word representative of the origin and nature of the event is to be stored. By doing this, it behaves as a DMA controller.

Since both the management of the priority of the interrupts and the memorization of the interrupts are organized within HDLC circuit 1 and by the circuit itself, the fact that the interrupts are managed with a delay by microprocessor 9 is not a problem. Microprocessor 9 just has to keep, for example in a register, the address of memory 2 containing the last interrupt of HDLC circuit 1 it has processed.

Figure 3:
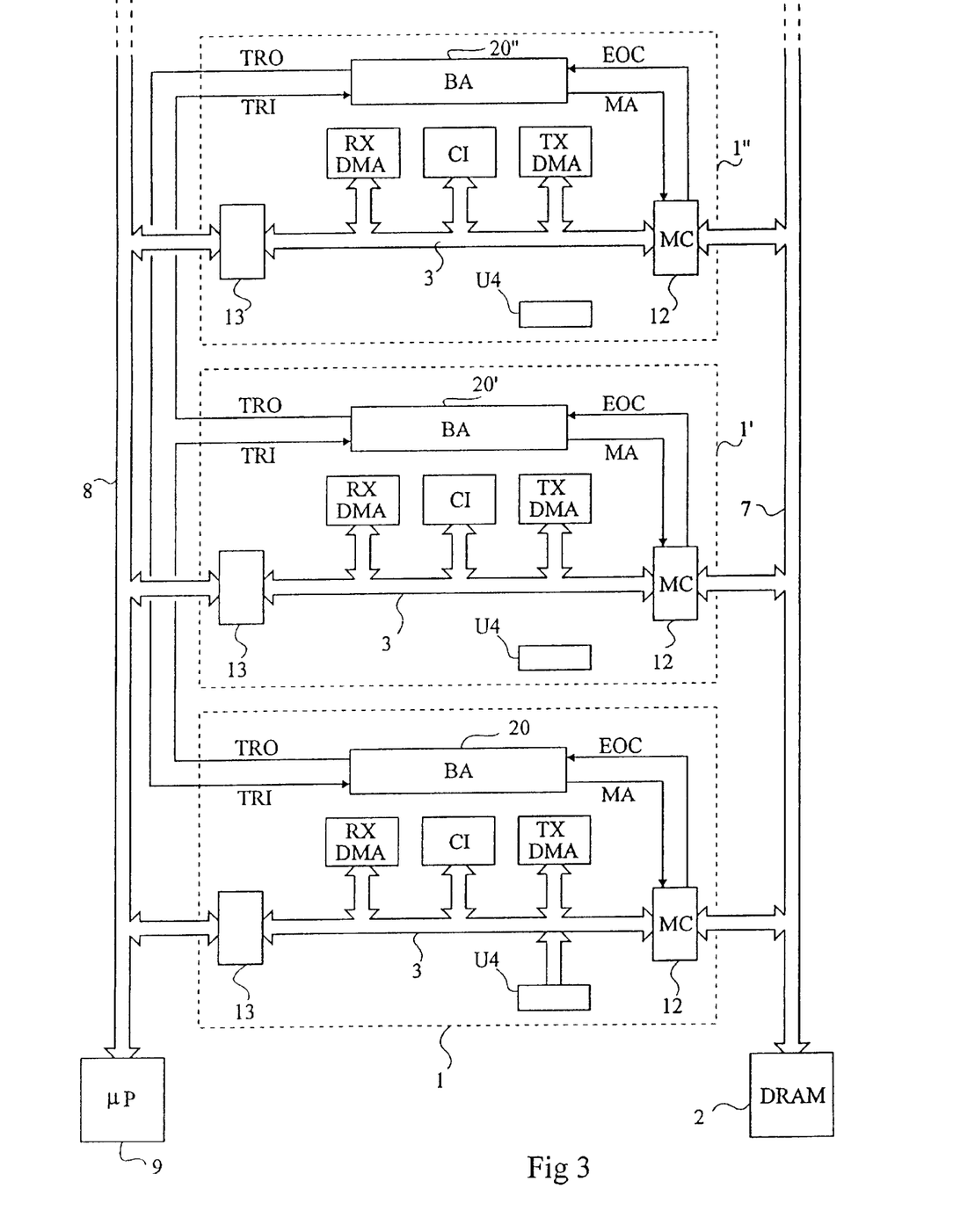
FIG. 3 shows, in the form of block diagrams, an embodiment of a "token" ring according to the invention associating several HDLC circuits of the type shown in FIG. 1.

FIG. 3 illustrates an embodiment of a "token" ring according to the invention enabling the sharing of a same memory 2 between several HDLC circuits 1, 1' and 1" corresponding to the circuit 1 shown in FIG. 1. The invention indeed enables several HDLC circuits to share a same external bus 7, and thus the same memory 2, and within each of the several HDLC circuits which an access priority order is established between the controllers RX_DMA, TX_DMA and CI.

For clarity, the example shown only includes three HDLC circuits 1, 1' and 1". In practice, the maximum number of HDLC circuits is a function of the mean frequency of the access requirements of the different HDLC circuits and of microprocessor 9 to memory 2.

In FIG. 3, the details of HDLC circuits 1, 1' and 1" have not been shown. In particular, FIFO memories 10 and 11 (FIG. 1) have not been shown although they have access to memory 2, since their accesses are controlled by the DMA controllers U1 or U2 with which they are respectively associated. Similarly, signals REQ0 to REQ4 and ACK0 to ACK4 have not been shown.

According to the invention, the sharing mode is organized in a ring, that is, the different HDLC circuits are successively given an assignment to external bus 7 of memory 2.

The sharing of external bus 7 is managed by the HDLC circuits themselves. For this purpose, the arbitration devices BA, respectively 20, 20' and 20" of the HDLC circuits, respectively 1, 1' and 1', are connected in a ring by means of signals TRI and TRO by a single-wired link. The output signal TRO of device 20 is sent onto the input of the signal TRI of device 20°, the output signal TRO of device 20' is sent onto the input of the signal TRI of device 20" and the output signal TRO thereof is sent onto the input of the signal TRI of device 20. The function of these signals TRI and TRO is to circulate a "token", in the form of a pulse, in the ring. Each HDLC circuit 1, 1' or 1" can give an access to external bus 7 when holding the "token".

The accesses to memory 2 requested by microprocessor 9 are only managed by arbitration device 20 of the HDLC circuit 1, selected arbitrarily.

Each HDLC circuit includes, preferably and for reasons of circuit standardization, a refreshing device U4 of memory 2. However, only one of these refreshing devices is operating, for example that of HDLC circuit 1. That is, as will be seen later, the minimum periodicity of the accesses to external bus 7 by HDLC circuit 1 is higher than the periodicity of the requests of refreshing device U4. The refreshing devices of the other HDLC circuits 1' and 1" are inhibited, and they have been shown with no link to the internal buses 3 associated therewith.

According to the invention, each time a pulse carried by the signal EOC of a memory controller 12 arrives on priority decoder 21 (FIG. 1) of the HDLC circuit associated therewith, the arbitration device of this circuit which holds the "token" issues a pulse on its output TRO. Thus, the following HDLC circuit receives the "token" and can assign external bus 7 to one of its entities via its internal bus 3, and so on. When an HDLC circuit has the "token" and an entity of this circuit wants to have access to memory 2, the arbitration device of this HDLC circuit positions the signal MA in state "1". If an arbitration device which receives the "token" has, at the inputs of its register RE (FIG. 1), no access request from one of its entities, it immediately sends the pulse to the following HDLC circuit through its signal TRO.

The compulsory circulating of the "token" at the arrival of a pulse on signal EOC forbids the monopolizing of external bus 7 by an HDLC circuit if another HDLC circuit requires it.

An advantage of such an association is that it enables a number of HDLC circuits to share a same memory 2 between themselves without using microprocessor 9 and while respecting an access balance between several circuits which simultaneously require external bus 7. Thus, several HDLC circuits according to the invention can be associated with a same RAM and with a same microprocessor of a line card.

Another advantage of the present invention is that the circulating of the "token" forbids an entity of an HDLC circuit to have access to external bus 7 to perform two successive memory cycles if another entity of the same circuit or of another HDLC circuit has also requested an access. Conversely, if it is the only one among all entities of all HDLC circuits to request access to memory 2, it will be the only one to have access to external bus 7.

If, for example, the duration of a memory cycle is around 250 nanoseconds and the period of the refresh cycles is 15 microseconds, if the time required for circulating the "token" is neglected, up to 60 HDLC circuits can be connected to external bus 7 without affecting the refreshing of memory 2. Indeed, by the compulsory circulating of the "token" at the end of each memory cycle, the refreshing device U4 associated with the sole HDLC circuit 1 is ensured to have access to external bus 7 at least once every refresh cycle.

To enable the circulating of the "token", each HDLC circuit 1, 1' or 1" includes, within the priority decoder 21 of its arbitration device, respectively 20, 20' and 20", a device for generating and regenerating the pulse (not shown in FIG. 3).

Figure 4:
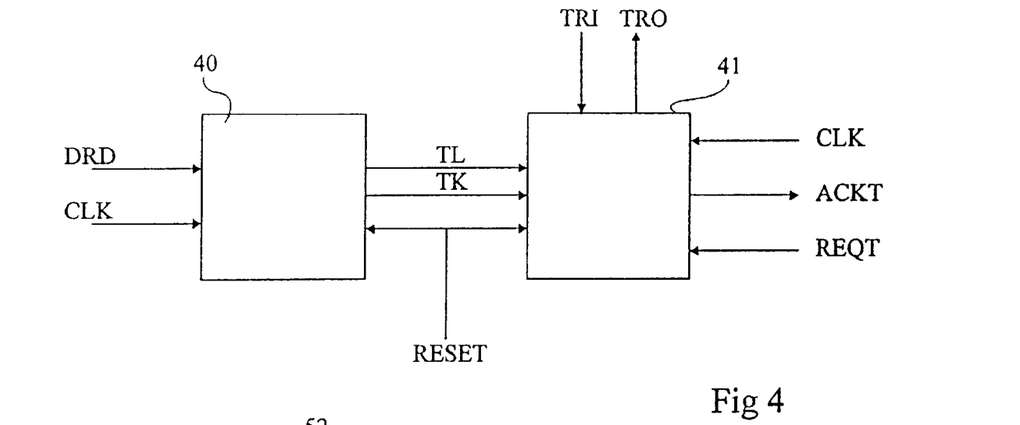
FIG. 4 shows, in the form of block diagrams, a device for generating and regenerating a "token", according to the invention, which is included in each of the HDLC circuits shown in FIG. 3.

FIG. 4 shows an embodiment of a device for generating and regenerating the pulse constituting the "token" according to the present invention.

Such a device includes a block 40 for initially generating the pulse constituting the "token" and a block 41 for regenerating the pulse when it circulates on the ring.

Block 40 has the function of generating a pulse at the starting of the circuit or after a reinitializing triggered by a pulse on a signal RESET. Signal RESET is used, as will be seen hereafter, either to generate a new "token" or to enable the local operation of an HDLC circuit 1, 1' or 1". Block 40 receives, from microprocessor 9, a bit DRD which is in state "1" during the periods when the ring is to operate and which is in state "0" outside these periods, for example for a local operation of one of the HDLC circuits. The "token" requiring to be initially generated by a single one of HDLC circuits 1, 1' and 1", only one HDLC circuit, arbitrarily selected, has its bit DRD positioned in state "1".

Block 40 issues to block 41 a signal TL carrying the "token" which it initially issues, as well as a binary signal TK, to enable the "token".

Block 41 has the function of receiving the "token" carried by signal TRI and to either almost immediately reissue the "token" on signal TRO if none of the entities associated therewith has requested access, or reissue the "token" at the end of a memory cycle that it assigns to one of the entities associated therewith.

Block 41 receives, besides the signal RESET issued by microprocessor 9 and signals TRI, TK and TL, a binary signal REQT indicative, by a state "1", of the presence of an access request within the circuit 1, 1' or 1" associated therewith. This signal REQT is positioned by the priority decoder 21 of the arbitration device 20, 20' or 20" of this HDLC circuit. Signal REQT corresponds, for example, to an OR-type logic combination of signals REQ0 to REQ4, at the input of register RE (FIG. 1) with signal MA, the result of this combination being enabled, for example, by an AND-type logic combination with the inverse of signal TRO and the inverse of signal EOC.

Block 41 further issues, besides signal TRO, a binary signal ACKT which signals, by a state "1", to the priority decoder 21 of the device 20, 20' or 20" associated therewith and when signal REQT is in state "1", the presence of the "token".

According to the invention, signal REQT also meets the following conditions. The signal REQT of an arbitration device which has access to memory 2 remains in state "1" for the whole duration of a memory cycle (in fact, while signal MA is in state "1") to hold the "token" until the end of the memory cycle that it is using. Further, the switching to state "0" of signal REQT is forced at the end of the memory cycle (in fact, slightly before the actual end of the cycle, for example at the arrival of a pulse on signal EOC) to force the sending of the "token", even if one signal REQ of the HDLC circuit having the access to external bus 7 is in state "1" at the input of register RE, to avoid the monopolizing of bus 7 by this HDLC circuit. Further still, the switching to state "1" of signal REQT during the clock cycle when the "token" is sent (signal TRO) is forbidden, to avoid the block 41 of the arbitration device which has just sent the "token" switching signal ACKT back to state "1".

Figure 5:
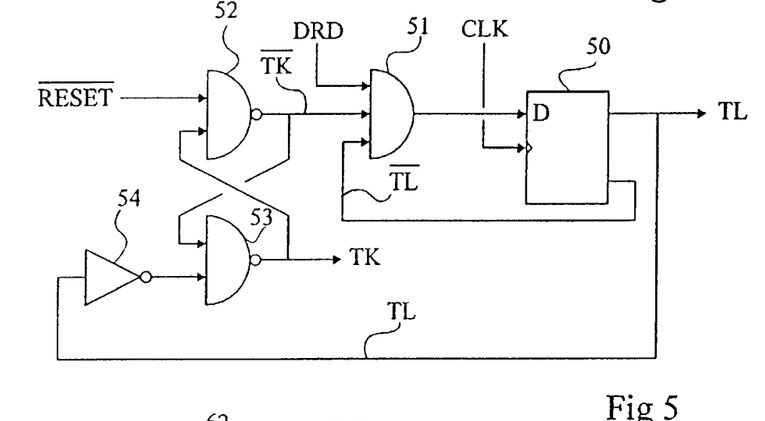
FIG. 5 shows an example of implementation of a block for generating the "token" of an HDLC circuit as shown in FIG. 4.
Figure 6:
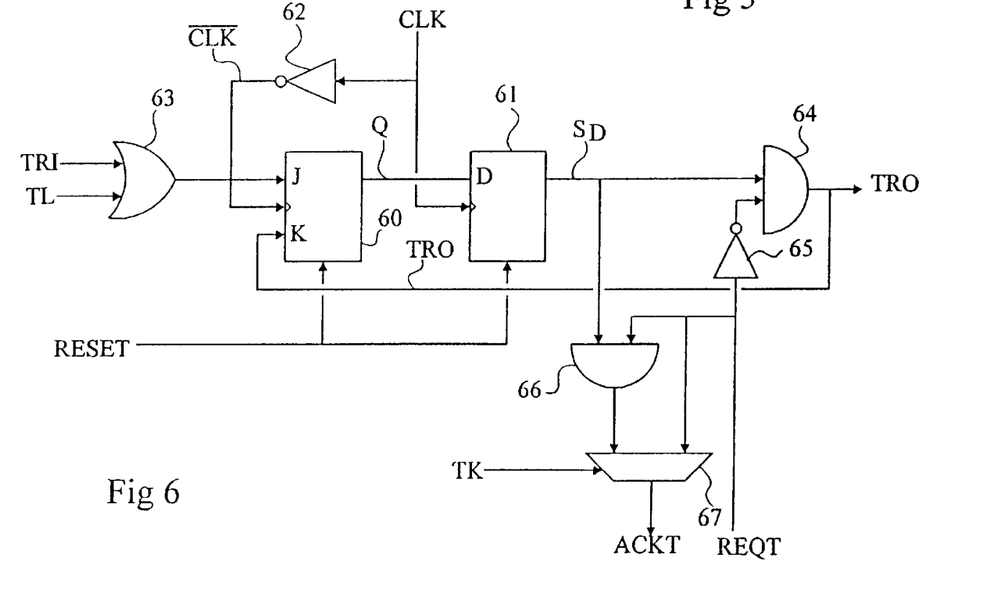
FIG. 6 shows an example of implementation of a block for regenerating the "token" of an HDLC circuit as shown in FIG. 4.

The practical implementation of the logic for obtaining signal REQT lies within the abilities of those skilled in the art according to the functional data in relation to FIGS. 4 to 6.

Blocks 40 and 41 further receive clock signal CLK. It will be seen to it that the signal CLK is the same for all HDLC circuits 1, 1' and 1" of the ring.

FIG. 5 shows an example of implementation of the block 40 for initially generating the "token".

The "token" is initially generated in the form of a pulse carried by the signal TL issued by a non-inverting output of a D flip-flop 50. Flip-flop 50 is driven by the rising edges of clock signal CLK. The D input of this flip-flop 50 is connected to the output of a three-input AND gate 51. This gate 51 receives bit DRD, the inverse of the signal TL issued by the inverting output of D flip-flop 50 and the inverse of signal TK. Signal TK is generated by the association of two two-input NAND gates 52 and 53, mounted as a bistable. A first gate 52 receives the inverse of the signal RESET and the output signal TK of a second gate 53. This second gate 53 receives the inverse of the signal TK issued by the output of gate 52 and the inverse of the signal TL issued by an inverter 54 having its input connected to the non-inverting output of D flip-flop 50.

Figure 7:
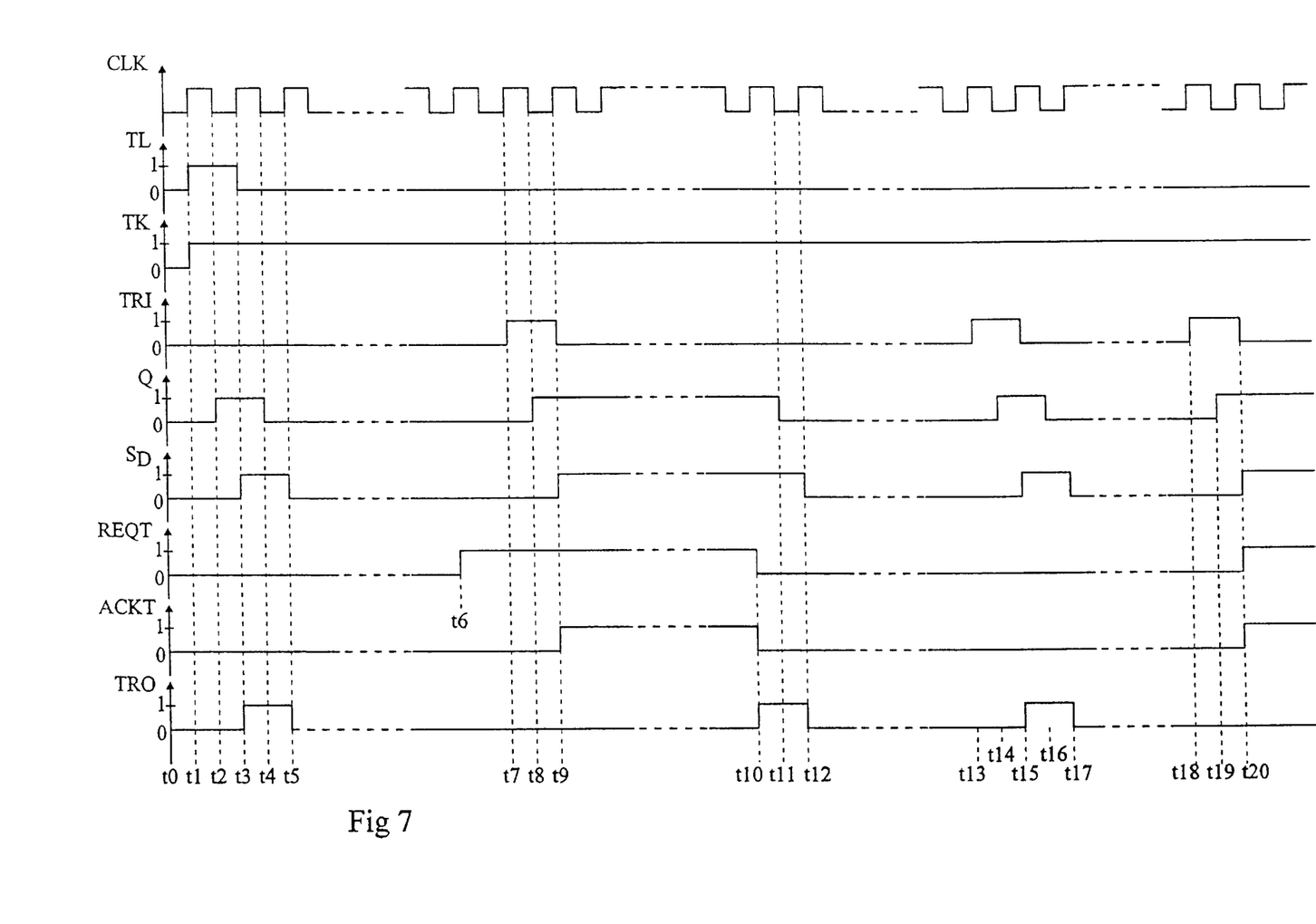
FIG. 7 illustrates, in the form of timing diagrams, the operation of a "token" ring according to the invention as shown in FIG. 3.

The operation of block 40 will be better understood in relation with the description of FIG. 7.

FIG. 6 shows an example of implementation of the block 41 for regenerating the "token".

Block 41 includes a JK flip-flop 60 having its non-inverting Q output sent to the input of a D flip-flop 61. D flip-flop 61 is driven by the rising edges of clock signal CLK while JK flip-flop 60 is driven by the trailing edges of the signal CLK which crosses, for this purpose, an inverter 62. JK flip-flop 60 receives on its J input an OR logic combination 63 of signals TL and TRI. The K input of JK flip-flop 60 receives the signal TRO which issues the regenerated "token". Signal TRO is issued by a two-input AND gate 64. The two inputs are connected, respectively, to the non-inverting output SD of D flip-flop 61 and to the output of an inverter 65 which receives signal REQT as an input. The output SD of D flip-flop 61 is further combined with a signal REQT in an AND gate 66. The output of gate 66 is connected to a first input of a multiplexer 67, a second input of which receives signal REQT. Multiplexer 67 is driven by the signal TK issued by block 40. The first input of multiplexer 67 is selected if signal TK is in state "1".

FIG. 7 illustrates the operation of blocks 40 and 41. This drawing shows, in the form of timing diagrams, signals CLK, TL, TK, TRI, Q, $S_D$, REQT, ACKT and TRO in a situation taken as an example. These signals are considered from the viewpoint of the HDLC circuit which receives bit DRD, for example circuit 1.

At the starting of the circuit, it is assumed that signals RESET, TRI, TRO and TL are in state "0". The inverse of signal TK thus is in state "1". When microprocessor 9 positions bit DRD in state "1" (time $t_0$), the output of AND gate 51 switches to state "1". Thus, at the following rising edge (time $t_1$) of clock CLK, signal TL switches to state "1".

The output of inverter 54 thus switches to state "0", which causes the switching to state "1" of signal TK at the output of NAND gate 53. The output of NAND gate 52 then switches to state "0". Meanwhile, the output of OR gate 63 (block 41) switches to state "1". Thus, at the following trailing edge (time $t_2$) of signal CLK, the Q output of JK flip-flop 60 switches to state "1".

The duration of the pulse issued by signal TL corresponds to one period of clock signal CLK. That is, at the following rising edge (time $t_3$), signal TL switches back to state "0" due to the switching to state "0" of AND gate 51 caused by the inverse of signal TL and the inverse of signal TK. The output of inverter 54 then switches to state "1", which maintains signal TK in state "1".

At time $t_3$, the output SD of D flip-flop 61 switches to state "1". As signal REQT is in state "0", signal TRO switches to state "1". At the same time, the J input of the JK flip-flop switches to state "0".

The duration of the pulse, or "token", issued by signal TRO is one period of clock CLK. Indeed, at the following trailing edge (time $t_4$) of signal CLK, the Q output of the JK flip-flop switches to state "0" since its K input is in state "1". Thus, at the following rising edge (time $t_5$) of clock signal CLK, signal TRO switches back to state "0".

The "token" then circulates on the ring to be, should the case arise, taken by other HDLC circuits. It is assumed that meanwhile, signal REQT switches to state "1" (time $t_6$), indicating that at least one entity of HDLC circuit 1 requests an access to memory 2.

When the "token" arrives on signal TRI (time $t_7$), the output of OR gate 63 switches to state "0". At the following trailing edge (time $t_8$) of signal CLX, the Q output of JK flip-flop 60 thus switches to state "1". Thus, at the following rising edge (time $t_9$) of signal CLK, output SD of D flip-flop 61 switches to state "1". This causes the switching to state "1" of the output of AND gate 66, and since signal TK is in state "1", signal ACKT switches to state "1". Priority decoder 21 can then grant an access authorization to external bus 7.

According to the invention, the signal LOAD issued by priority decoder 21 actually is a logic combination taking signal ACKT into account, besides signals CLK, EOC and MA. This enables to only load signals REQI to REQ4 (FIG. 1) in register RE when HDLC circuit 1 has the ability to authorize an access to internal bus 3. It is thus avoided that a first entity, for example controller RX_DMA, having a high priority rank, is overtaken by a second entity, for example controller TX_DMA of the same circuit 1 having a low priority number but having issued an access request before the arrival of the "token" and before the first entity. The practical implementation of the logic combination for obtaining signal LOAD is within the abilities of those skilled in the art according to the functional indications given hereinabove.

As an alternative, signal ACKT can be replaced by signal TRI for the enabling of signal LOAD. The use of signal TRI enables the present invention to anticipate, by one period of clock signal CLK, the authorization to grant an access.

Since signal REQT is in state "1", the switching to state "1" of signal SD, caused by the switching of signal TRI to state "0" at time $t_9$, does not result in sending the "token" onto signal TRO.

Signals Q, $S_D$, ACKT remain in state "1" as long as signal REQT does not switch to state "0". Indeed, although the J input of JK flip-flop 60 switches to state "0" at time $t_9$, the flip-flop maintains its output state, that is, Q in state "1", as long as its K input does not switch back to state "1". Unless there is an action of signal RESET, the switching of output SD of flip-flop 60 can thus only be triggered by the sending of the "token", and thus by the switching to "0" of signal REQT. However, signal REQT remains in state "1" until the arrival of a pulse on signal EOC even if all signals REQ0 to REQ4 at the input of register RE are in state "0". The "token" is thus held for the whole duration of the memory cycle.

At the arrival of a pulse on signal EOC indicating the close ending of a memory cycle, signal REQT switches to state "0" (time $t_{10}$). At this time, the output of AND gate 66 then switches to state "0", causing the switching to state "0" of signal ACKT. The output of AND gate 64 then switches to state "1". Thus, the "token" is sent before the actual end of the memory cycle.

The switching to state "1" of signal TRO causes, at the following trailing edge (time $t_1$) of signal CLK, the switching to state "0" of the Q output of JK flip-flop 60. At the following rising edge (time $t_{12}$) of signal CLK, output SD of D flip-flop 61 switches to state "0", which causes the switching to state "0" of signal TRO.

It should be noted that during the sending of the "token", that is, while signal TRO is in state "1", signal REQT is blocked in state "0" even if one of signals REQ0 to REQ4 at the input of register RE is in state "1". It is thus avoided for the "token" to be partially sent and for signal ACKT to switch back to state "1". Further, the "token" is forced to circulate, to avoid the situation where a same HDLC circuit monopolizes external bus 7, and thus memory 2.

When a "token" comes back into the device (time $t_{13}$), if signal REQT is in state "0" for the whole time when signal TRI is in state "1", the "token" is almost immediately regenerated. The operation of block 41 between times $t_{13}$, $t_{14}$, $t_{15}$, $t_{16}$ and $t_{17}$ is similar to the operation described for times $t_1$ to $t_5$.

It is thus observed that the generation or the almost immediate regeneration of the "token" actually lasts for one period of clock signal CLK.

The limit for the arrival of an access request from an entity of an HDLC circuit when the arbitration device associated therewith holds the "token" is illustrated by times $t_{18}$ to $t_{20}$. For the arbitration device to hold the "token", it is enough for signal REQT to switch to state "1" before the end of the arrival of the "token", that is, before signal TRI switches back to state "0".

It should be noted that if signal REQT is in state "1" at the initial generation of the "token" (time $t_1$ to $t_3$), signal TL has the same effects as the signal TRI at time $t_{10}$ or at time $t_{18}$. It should also be noted that the "token" is synchronous with clock signal CLK.

Signal RESET suppresses the "token", whatever the state of the HDLC circuit wherein it is found, and causes the generation of a new "token" at the following period of signal CLK. Gates 52 and 53 of block 40 generate this new "token", even if signal RESET only carries one pulse and has switched back to state "0" when the rising edge of this next period appears.

Signal TK enables, when a single HDLC circuit, for example circuit 1, is to be authorized to have access to memory 2, the avoidance of the circulating of the "token" and operates the arbitration device 20 of this circuit 1 in a local mode. HDLC circuit 1 then once again finds contiguous memory cycles in case of an influx of access requests from the entities associated therewith. For this purpose, bit DRD is positioned in state "0" to prevent the generation of a "token" and the signal RESET of device 1 is positioned in state "1" while the signals RESET of the other devices 1' and 1" are maintained in state "0". Arbitration devices 20' and 20" have their respective signal TK in state "1" and expect a "token" which will not come, while arbitration device 20 operates as if it permanently held the "token", due to its signal TK being in state "0". Indeed, as soon as the signal REQT of circuit 1 switches to state "1", its signal ACKT switches to state "1" due to the selection of the second input of multiplexer 67. Such an operating mode can be useful, for example, when a single one of the HDLC circuits is operating. The "token" then is automatically established, under control of microprocessor 9, as soon as another HDLC circuit 1' or 1" is started.

It should be noted that, even if the bit DRD of device 20 is in state "1", the "token" will not be sent by the device since signal RESET is kept in state "1", which forces signal SD in state "0". However, the signal TL of device 20 reproduces, in this case, signal CLK, which causes power consumption.

The fact that each HDLC circuit 1, 1' or 1" includes a memory controller 12 is not at all a nuisance for the operation of the ring and of signals EOC and MA. Indeed, two signals MA, respectively associated with two memory controllers 12, cannot simultaneously be in state "1" since the switching to state "1" of a signal MA can only be caused by the arbitration device 20, 20' or 20" which holds the "token".

Moreover, even if each memory controller 12 generates a pulse on its signal EOC at each end of a memory cycle, whether the cycle has been used or not by the HDLC circuit associated therewith, only the HDLC circuit which receives the "token" can request an access to external bus 7.

As an alternative, only the memory controller 12 having a signal MA in state "1" generates, according to the invention, a pulse at the end of a memory cycle on its signal EOC.

An advantage of the present invention is that it optimizes the accesses to memory 2 between several HDLC circuits and the microprocessor 9, while freeing microprocessor 9 to perform other tasks.

Indeed, the external bus 8 of microprocessor 9 is free while an HDLC circuit has access to memory 2. Thus, microprocessor 9 can, while memory 2 is being used, perform various tasks (except an access to memory 2), should the need arise, by communicating via external bus 8 with other HDLC circuits or other peripherals.

Of course, the present invention is likely to have various alterations, modifications, and improvements which will readily occur to those skilled in the art. In practice, each of the components described can be replaced by one or several elements performing the same function.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A high level data link control (HDLC) integrated circuit of a type including at least one HDLC controller and one direct memory access (DMA) controller, the HDLC circuit including organizing means for organizing access to a first external bus for connection to an external memory via an internal bus to which are connected a plurality of different entities which require access to the external memory, said DMA controller being one of said entities and the internal bus being connected to the first external bus via a memory controller integrated in the HDLC circuit and constituting an electric interface between the internal bus and the first external bus, wherein a microprocessor is connected to the internal bus via a second external bus, the internal bus being connected to the second external bus via an interface integrated in the HDLC circuit, access of the microprocessor to the internal bus being managed by the HDLC circuit which considers the microprocessor, on these grounds and via its interface, as one of its entities.

2. An HDLC circuit according to claim 1, wherein the interface is programmable through pins of the HDLC circuit to adapt to different types of microprocessors.

3. An HDLC circuit according to claim 1, wherein the memory controller includes programmable adapting means for programmably adapting to different types, capacities and access speeds of the external memory, and wherein one entity of the plurality of entities is a device for refreshing a dynamic memory (DRAM).

4. A high level data link control (HDLC) integrated circuit of a type including at least one HDLC controller and one direct memory access (DMA) controller, the HDLC circuit including organizing means for organizing access to a first external bus for connection to an external memory via an internal bus to which are connected a plurality of different entities which require access to the external memory, said DMA controller being one of said entities and the internal bus being connected to the first external bus via a memory controller integrated in the HDLC circuit and constituting an electric interface between the internal bus and the first external bus, wherein the organizing means comprises an arbitration device receiving a plurality of asynchronous access request signals representing requests for access to the internal bus issued by each entity of said plurality of entities, respectively, the arbitration device issuing a plurality of binary signals authorizing access to one of said entities, respectively, based on a determination of priority between the different access requests by a wired logic priority decoder associated with an input register, a loading of a state of the access request signals in the input register happening, if no memory cycle is running, periodically, by a clock signal and, if a memory cycle is running, at an occurrence of a pulse on a signal issued by the memory controller anticipating an end of the memory cycle by a processing delay which is a function of a processing time of the plurality of access requests performed by the priority decoder.

5. An HDLC circuit according to claim 4, wherein the priority decoder sends to the memory controller a binary signal indicative of a presence of an authorized access request, the loading of the plurality of access request signals indicative of an access request in the input register being enabled by an inverse of a binary signal indicative of the presence of an authorized access request.

6. An HDLC circuit according to claim 3, wherein the refreshing device has a specific priority management which includes being assigned a lowest priority rank for a first half-period of a time interval separating two access requests from the refreshing device and being assigned a highest priority rank for a second half-period of this time interval if its access request has not been answered during the first half-period.

7. An HDLC circuit according to claim 6, wherein the priority rank associated with each entity, other than the refreshing device, is contained in a programmable register included in the arbitration device.

8. An HDLC circuit according to claim 1, wherein three entities of the plurality of entities are respectively constituted by a DMA reception controller, a DMA transmission controller and an interrupt controller.

9. An HDLC circuit according to claim 8, wherein the interrupt controller includes memorization organizing means for organizing memorization of words representative of at least an origin and nature of interrupts emitted by different components of the HDLC circuit in several areas of the memory.

10. An HDLC circuit according to claim 4, wherein the arbitration device includes connecting means for connecting to at least one other arbitration device of at least one other HDLC circuit of a same type to organize a sharing of the external memory between the at least two HDLC circuits, an assignment of the first external bus to one of the at least two HDLC circuits being performed by circulating a token pulse in a single-wired link connecting the at least two HDLC circuits in a ring, each HDLC circuit receiving the token pulse on an input signal sent by the at least one other HDLC circuit on an output signal.

11. An HDLC circuit according to claim 10, wherein the connecting means further comprises enabling means for enabling an assignment of the internal bus to one entity of the plurality of entities of the respective HDLC circuit when the token pulse is present in the arbitration device included therein.

12. An HDLC circuit according to claim 10, wherein the connecting means further comprises triggering means for triggering the sending of the token pulse onto the output signal either by an occurrence of the signal indicative of the end of a memory cycle, or by an absence of access requests from the plurality of entities of the HDLC circuit associated therewith while the token pulse is present on said input signal.

13. An HDLC circuit according to claim 10, wherein the connecting means further comprises a circuit to regenerate the token pulse, the circuit to receive, besides the input signal, a binary signal indicative of the existence of an access request within the HDLC circuit associated therewith to issue, to the priority decoder of the arbitration device associated therewith, a binary signal indicative of an assignment of the token pulse, a width of the token pulse corresponding to one period of the clock signal.

14. A high level data link control (HDLC) integrated circuit, comprising:

a first external bus;

an internal bus;

a memory controller integrated in the HDLC circuit which connects the first external bus to the internal bus;

a plurality of different entities connected to the internal bus, each different entity requiring access to the external memory at some time during its operation; and prioritizing means, connected to the memory controller and each different entity, for prioritizing, among the plurality of different entities, access to the first external bus, wherein the prioritizing means comprises:

an input register to receive at least one asynchronous binary signal of a first type representing a request for access to the internal bus issued by at least one entity of said plurality of entities;

an output register; and a wired logic priority decoder connected to the input register and to the output register, the priority decoder issuing at least one binary signal of a second type to authorize the access of the at least one requesting entity to the internal bus based on a determination of priority among different access requests.

15. An HDLC circuit according to claim 14, further comprising:

a second external bus; and an interface circuit which connects the second external bus to the internal bus.

16. An HDLC circuit according to claim 15, wherein the interface circuit is programmable to adapt to different types of devices connected to it.

17. An HDLC circuit according claim 15, further comprising:

a memory refresh device connected to the internal bus and the prioritizing means, the memory refresh device to refresh a dynamic memory.

18. An HDLC circuit according to claim 14, further comprising:

a programmable register connected to the priority decoder, the register containing a unique priority rank associated with a respective entity.

19. An HDLC circuit according to claim 14, wherein the prioritizing means further comprises:
   connecting means for connecting the HDLC circuit to at least one other HDLC circuit of a same type to organize the sharing of the external memory therebetween;
   a token generating circuit to generate a token;
   a token re-generating circuit to receive the token from the token generating circuit and to output the token on an output signal line; and
   receiving means for receiving the token on an input signal sent by the at least one other HDLC circuit.

20. A high-level data link control (HDLC) circuit for controlling access to an external bus among a plurality of devices, the HDLC circuit comprising:
   an internal bus;
   a first external bus;
   a plurality of devices connected to the internal bus, each of the devices to read/write data from/to the internal bus;
   a memory controller connected to the internal bus and the first external bus, the memory controller to transfer address and data information between the internal bus and the first external bus; and
   an arbitration device connected to each access device of the plurality of access devices and the memory controller, the arbitration device to receive at least one request to access the first external bus through the internal bus from at least one access device and the arbitration device to grant access to a requesting access device having a highest access priority level amongst the access devices requesting access by sending an access granted signal to the requesting access device having the highest access priority level amongst the access devices requesting access,
   wherein the arbitration device comprises:
   an input register to receive the at least one access request from the at least one access device;
   a priority register to store a plurality of unique access priority levels associated, respectively, with each access device of the plurality of access devices;
   a priority decoder circuit connected to the priority register and the input register, the priority decoder circuit to receive the at least one access request from the input register and determine an access priority level for each at least one access request as a function of the access priority levels stored in the priority register, the priority decoder circuit to output the access granted signal to the requesting access device having the highest access priority level; and
   an output register connected to the plurality of access devices the output register to receive the access granted signal from the priority decoder circuit and output the access granted signal to the requesting access device having the highest access priority level.

21. The HDLC circuit as recited in claim 20, further comprising:
   a second external bus; and
   an interface device connected to the second external bus, the internal bus and the arbitration device, the interface device to transfer address and data information between the internal bus and the second external bus and to send an access request to the arbitration device and to receive an access granted signal from the arbitration device.

22. The HDLC circuit as recited in claim 20, further comprising:
   a memory refresh device connected to the internal bus and the arbitration device to refresh a dynamic memory device connected to the external bus, a refresh rate of the memory refresh device having a refresh period of time.

23. The HDLC circuit as recited in claim 22, wherein the arbitration device further comprises:
   refresh device access priority level assigning means for assigning a first access priority level to the memory refresh device during a first part of the refresh period and for assigning a second access priority level to the memory refresh device during a second part of the refresh period.

24. The HDLC circuit as recited in claim 20, wherein the arbitration device further comprises:
   a token pulse processing circuit to receive and transmit a token pulse from and to at least one other HDLC circuit;
   wherein the priority decoder circuit grants access to a requesting access device only when the token pulse processing circuit is in receipt of the token pulse; and
   wherein the token pulse processing circuit holds the token pulse until an end of a memory access operation and then transmits the token pulse to the at least one other HDLC circuit.

25. A method of controlling access to an internal bus in a high level data link control circuit including the internal bus and a plurality of entities, wherein one entity of the plurality of entities is a memory refresh device, the plurality of entities connected to the internal bus, the method comprising the steps of:
   defining a refresh period as a maximum time interval allowable between two accesses of the internal bus made by the memory refresh device;
   assigning a unique access priority level to each entity of the plurality of entities other than the memory refresh device;
   assigning a lowest access priority level to the memory refresh device during a first part of the refresh period;
   receiving at least one access request to access the internal bus from at least one of the entities of the plurality of entities; and
   granting access to the requesting entity having the highest access priority level among the entities requesting access.

26. The method as recited in claim 25, further comprising the step of assigning a highest access priority level to the memory refresh device during a second part of the refresh period.

27. The method as recited in claim 25, further comprising the step of assigning the lowest access priority level to the memory refresh device during a second part of the refresh period when the access was granted to the memory refresh device during the first part of the refresh period.

28. The method as recited in claim 25, wherein the step of granting access includes the steps of:
   storing an indication of the entity which last accessed the internal bus; and
   granting access to the requesting entity having the highest access priority level among the entities requesting access only when it is not the entity which last accessed the internal bus.

* * * * *